Patented May 19, 1936

2,041,453

UNITED STATES PATENT OFFICE 2,041,453

RESINOUS COMPOSITION AND PROCESS OF MAKING SAME

Howard L. Bender, Bloomfield, N. J., assignor to Bakelite Corporation, New York, N. Y., a corporation of Delaware No Drawing. Application June 1, 1931,
Serial No. 541,520

8 Claims. (Cl. 260—4)

The present invention relates to a method for the production of resinous compositions of novel and valuable properties and to the new resinous compositions thereby produced.

Briefly stated, the invention comprises making a phenolic condensation product of the reactive type and adding thereto a basic metallic compound, for example calcium hydroxide, in an amount sufficient to combine with at least a portion of the hydroxyl groups of the phenolic condensation product.

To the composition thus produced may be added various materials in order to modify the properties of the composition and to adapt it to various technical uses. For example, the addition of fillers, such as wood flour or asbestos, with or without other materials for imparting special properties, results in the production of molding compositions of very desirable qualities. These additional materials may be added to the composition, together with the basic metallic compound, or separately. The new composition may also, for example, be dissolved or dispersed in liquid media for use as a varnish or as an impregnating agent.

The term "phenolic condensation product of the reactive type" as used herein is intended to comprise reaction products of a phenol with compounds containing a reactive methylene group, such as formaldehyde, which products upon further heating are rapidly transformed into infusible, insoluble resinoids; and particularly it is intended to comprise the reaction products of a phenol with at least one mole of formaldehyde or its equivalent, such reaction products being characterized by being rapidly converted by heat to an insoluble and infusible modification.

A further characteristic of the resinous reaction products to which the present invention is particularly applicable is that they consist, in the greater part, of compounds containing approximately one-half of the hydroxyl groups contained in the original phenol entering into the reaction, as determined by the reactivity of the substantially phenol-free product with alkalies.

In practicing the invention a reactive phenolic condensation product is made by reacting one mole of a phenol and one or more moles of formaldehyde, or its equivalent, in the presence of a catalyst such as ammonia or oxalic acid, the reaction being stopped in the manner well-known in the art before the final insoluble and infusible stage is reached. To the reaction product thus produced a basic metallic compound, such as calcium hydroxide, is added in an amount in excess of that necessary to render the reaction product neutral to such indicators as methyl orange, as determined for example by boiling the product with an equal volume of water and testing the aqueous liquid with the indicator. When the resinous compositions of the invention are tested by boiling with an equal volume of water, the latter gives an alkaline reaction with methyl orange and similar indicators.

The amount of base added to the reaction product may be varied within considerable limits, an advantageous effect being obtained with 0.01 mole of basic compound to each mole of the phenol entering into the reaction, the relative effect of added quantities decreasing up to the limit contemplated by the present invention, that is, 0.5 mole to each mole of reacted phenol. When calcium hydroxide is used as the basic material it may be advantageously added in amounts up to about 15 parts to each 100 parts of the phenolic condensation product.

The basic compound may be added to the phenolic condensation product either before or after the dehydration of the product, or at any stage during the dehydration. It is desirable, however, that any dehydration which is to be effected in the presence of the basic compound should be carried out under such conditions as to alter the resin to the least possible extent, for example, by carrying out the dehydration at a low temperature under a vacuum, or by effecting a rapid dehydration at higher temperatures.

When the phenolic condensation product is made with the use of an acid catalyst the acid present in the product should be either removed before adding the basic compound or a sufficient amount of the basic compound should be added to neutralize the acid, as well as any unreacted phenol and/or acidic by-products of the reaction, in addition to the amount of basic compound to be added in accordance with the above disclosure. When the acids are neutralized in this way the salts so formed may, if desired, be removed by washing with water.

The new resinous compositions of the invention have particularly valuable molding qualities, which make them of great importance in obtaining economical production of molded articles. Together with a very rapid rate of molding, the compositions are particularly free from tendencies to stain or stick to the molds. The result of this is that a very large number of articles may be molded consecutively in the same mold without any interruption of operation for cleaning the molds, and every article so produced has the same excellent surface and uniformity of appearance.

The invention will be illustrated by the following examples which represent some of the typical embodiments of the invention:

1. 100 grams of phenol, 86 grams of 37.5% formaldehyde and 3.5 grams of 28% ammonia were reacted in the usual manner for 80 minutes. The reaction product was then dehydrated rapidly to a water content of about 10%, 11 grams of hydrated lime were added and dehydration was continued to give a brittle resin. This product gave an excellent molding mixture when mixed with wood flour filler.

2. 94 grams of phenol, 200 grams of 37.5% formaldehyde solution and 1.5 grams of oxalic acid were reacted in the usual manner for 60 minutes. 2 grams of hydrated lime were then added to the resinous product and the mixture was dehydrated. The dry product was made into a varnish by adding an equal weight of alcohol. The 50% varnish thus obtained was very valuable for use in saturating fibrous materials such as paper, or for the production of molding mixtures.

A molding composition made by mixing the varnish with wood flour in the proportion of 40% of resin to 60% of wood flour and drying was a free flowing, fairly quick setting molding mixture which did not stain or stick to the molds.

3. 100 grams of cresol, 100 grams of 37.5% formaldehyde solution and 3 grams of 28% ammonia were reacted in the usual manner for one hour. The product was dehydrated rapidly under a vacuum of 25 inches to a boiling point of 105° C. 3 grams of barium hydroxide was added and the product was again dehydrated under vacuum to a boiling point of 110° C. and cooled.

By mixing the resinous product with 2 grams of stearin, 120 grams of wood fiber and 7 grams of asbestos, warm rolling and grinding to 40 mesh, an excellent molding mix was obtained which when molded at 150° C. under 1000 pound pressure per square inch could be removed hot from the mold in four minutes.

4. 94 grams of phenol, 400 grams of 37.5% formaldehyde solution and 0.5 gram of oxalic acid were reacted in the usual manner for fifty minutes and the resin was separated from the weak formaldehyde solution. 1.8 grams of hydrated lime was added to the wet resin. The dehydrated product was a rapidly hardening resinous composition which with the usual fillers resulted in excellent molding compositions.

I claim:

1. In the production of hot-moldable resinous compositions, the improvement which comprises reacting together a phenol and a compound containing a reactive methylene group to produce a heat-reactive condensation product, reacting therewith an alkali earth metal hydroxide in amount sufficient to combine with at least a portion of the hydroxyl groups of the condensation product at a temperature below that at which substantial polymerization of the condensation product occurs, and dehydrating to produce a resinous material capable of becoming infusible in a hot-molding composition within at least four minutes at about 150° C.

2. In the production of hot-moldable resinous compositions, the improvement which comprises reacting together a phenol and a compound containing a reactive methylene group to produce a heat-reactive condensation product, reacting therewith an alkali earth metal hydroxide, in the proportion of from about 0.01 mole to 0.5 mole of the hydroxide to each mole of the reacted phenol in the condensation product, at a temperature below that at which substantial polymerization of the condensation product occurs, and dehydrating to produce a resinous material capable of becoming infusible in a hot-molding composition within at least four minutes at about 150° C.

3. In the production of hot-moldable resinous compositions, the improvement which comprises reacting together a phenol and a compound containing a reactive methylene group to produce a heat-reactive condensation product, reacting therewith calcium hydroxide, in amount sufficient to combine with at least a portion of the hydroxyl group of the condensation product, at a temperature below that at which substantial polymerization of the condensation product occurs, and dehydrating to produce a resinous material capable of becoming infusible in a hot-molding composition within at least four minutes at about 150° C.

4. In the production of hot-moldable resinous compositions, the improvement which comprises reacting together a phenol and a compound containing a reactive methylene group to produce a heat-reactive condensation product, reacting therewith calcium hydroxide, in the proportion of from about 0.01 mole to 0.5 mole of the hydroxide to each mole of reacted phenol in the condensation product, at a temperature below that at which substantial polymerization of the condensation product occurs, and dehydrating to produce a resinous material capable of becoming infusible in a hot-molding composition within at least four minutes at about 150° C.

5. A dehydrated resinous composition comprising a condensation product of a phenol with a compound containing a reactive methylene group, which condensation product is hardenable of itself by heat alone to the infusible state, said condensation product being combined without substantial polymerization with an alkali earth metal hydroxide in amount sufficient to combine with at least a portion of the hydroxyl groups of the condensation product, said composition being capable of flowing under the combined effect of heat and pressure, and capable of becoming infusible in a hot-molding composition within at least four minutes at 150° C.

6. A dehydrated resinous composition comprising a condensation product of a phenol with a compound containing a reactive methylene group, which condensation product is hardenable of itself by heat alone to the infusible state, said condensation product being combined without substantial polymerization with an alkali earth metal hydroxide in the proportion of from about 0.01 mole to 0.5 mole of the hydroxide to each mole of reacted phenol in the condensation product, said composition being capable of flowing under the combined effect of heat and pressure, and capable of becoming infusible in a hot-molding composition within at least four minutes at 150° C.

7. A dehydrated resinous composition comprising a condensation product of a phenol with a compound containing a reactive methylene group, which condensation product is hardenable of itself by heat alone to the infusible state, said condensation product being combined without substantial polymerization with calcium hydroxide in amount sufficient to combine with at least a portion of the hydroxyl groups of the condensation product, said composition being capable of flowing under the combined effect of heat and pressure, and capable of becoming infusible in a hot-molding composition within at least four minutes at 150° C.

8. A dehydrated resinous composition comprising a condensation product of a phenol with a compound containing a reactive methylene group, which condensation product is hardenable of itself by heat alone to the infusible state, said condensation product being combined without substantial polymerization with calcium hydroxide in the proportion of from about 0.01 mole to 0.5 mole of the hydroxide to each mole of reacted phenol in the condensation product, said composition being capable of flowing under the combined effect of heat and pressure, and capable of becoming infusible in a hot-molding composition within at least four minutes at 150° C.

HOWARD L. BENDER.